United States Patent [19]

Masuoka et al.

[11] 3,898,344

[45] Aug. 5, 1975

[54] PACKAGED DRY IMITATION VINEGAR PRODUCT

[75] Inventors: Yoshito Masuoka, Cochituate; Karl R. Johnson, Holliston; Abdul R. Rahman, Natick, all of Mass.

[73] Assignee: The United States of America as represented by the Secretary of the Army, Washington, D.C.

[22] Filed: May 24, 1973

[21] Appl. No.: 363,767

[52] U.S. Cl. ............... 426/124; 426/126; 426/650
[51] Int. Cl.² .................... B65D 81/26; A23L 1/226
[58] Field of Search .......... 426/124, 221, 222, 175, 426/17

[56] References Cited
UNITED STATES PATENTS

| | | | |
|---|---|---|---|
| 2,153,849 | 4/1939 | Speas | 426/221 X |
| 2,548,780 | 4/1951 | Gary et al. | 426/131 X |
| 2,609,298 | 9/1952 | Kirby | 426/221 |
| 2,696,441 | 12/1954 | Kmieciak et al. | 426/175 X |
| 3,078,201 | 2/1963 | Christie | 426/126 |
| 3,118,771 | 1/1964 | Albrecht | 426/221 |
| 3,346,396 | 10/1967 | Kitayama | 426/221 X |
| 3,445,244 | 5/1969 | Noznick et al. | 426/221 X |
| 3,523,024 | 8/1970 | Nesty | 426/222 |
| 3,630,756 | 12/1971 | Smith et al. | 426/221 |
| 3,672,914 | 6/1972 | Delaney | 426/222 X |

FOREIGN PATENTS OR APPLICATIONS

| | | | |
|---|---|---|---|
| 2,015,522 | 1/1971 | Germany | 426/221 |

OTHER PUBLICATIONS

Modern Packaging, Jan. 1949, pp.129–133.
Food Engineering, April 1954, pp. 79–81.

*Primary Examiner*—Frank W. Lutter
*Assistant Examiner*—Steven L. Weinstein
*Attorney, Agent, or Firm*—Nathan Edelberg; Robert P. Gibson; Charles C. Rainey

[57] ABSTRACT

A dry imitation vinegar product which has long term storage stability at high temperatures, and the method of making the product. The product comprises a mixture of sodium diacetate, sodium acetate, and dl malic acid packaged in a moisture impermeable container. Long term storage of the product at high temperatures is made possible by in-package desiccation with calcium oxide, which keeps the moisture content of the mixture below 0.1 percent.

2 Claims, No Drawings

PACKAGED DRY IMITATION VINEGAR PRODUCT

The invention described herein may be manufactured, used, and licensed by or for the Government for governmental purposes without the payment to us of royalty royality thereon.

BACKGROUND OF THE INVENTION

This invention relates to a dry imitation vinegar product and method of making the same, and more particularly to a free-flowing powdered dry imitation vinegar product which retains its free-flowing characteristics over long storage periods at high temperatures as long as it is maintained free from contact with water in either liquid or vapor form.

The Armed Forces have for a number of years used a dry synthetic vinegar which contains glacial acetic acid and citric acid adsorbed on a binder comprising dl malic acid and a sugar. Such a composition is described in U.S. Pat. No. 2,696,441 and covered by Military Specification MIL-V-0035017C. However, this type of imitation vinegar rapidly deteriorates in storage, forming a slurry which delaminates laminated packaging materials, thus permitting leakage of the slurry to occur.

It is, therefore, an object of the invention to provide a method of making a dry imitation vinegar which will flow freely as a dry powder and will retain its free-flowing characteristics over long storage periods at high temperatures as long as the dry powder is maintained free from contact with liquid water or moisture vapor, and to provide the dry imitaion vinegar product.

It is also an object of the invention to provide a dry imitation vinegar product which will not cause delamination of flexible laminated packaging materials in which it is packaged, even though it may be stored at high temperatures. vapor of for Other objects and advantages of the invention will become apparent from the following description of several embodiments of the invention, and the novel features will be particularly pointed out hereinafter in connection with the appended claims.

SUMMARY

We have found that a dry imitation vinegar product having long term storage stability and free flowing characteristics as a powder even after long term storage at high temperatures may be obtained by preparing a mixture of sodium diacetate, sodium acetate, and dl malic acid in powder form in an atmosphere in which the relative humidity is maintained below about 35 percent so that relatively little moisture will be picked up from the atmosphere by the mixture. The mixture is placed in a container having walls which are substantially moisture bapor impermeable. Prior to closure of the container, a moisture vapor permeable envelope containing a predetermined amount of calcium oxide to serve as an in-package desiccant for the above mixture is placed in the container, which is then hermetically sealed. During subsequent storage of the dry imitation vinegar product, the moisture content of the mixture is reduced to less than 0.1 percent by the migration of moisture from the mixture into the envelope of calcium oxide and reaction with the calcium oxide. Thus the dry imitation vinegar mixture becomes very stable with respect to high temperature storage, ofr example storage at temperatures above 100° F. It does not cake or form a slurry and does not exhibit any tendency to delaminate laminated flexible packaging materials, which are frequently used for the packaging of dry imitation vinegar products.

The proportions of the above-mentioned ingredients may be varied somewhat while still retaining the essential characteristics of dry imitation vinegar. Also minor proportions of various other materials to serve specific purposes may beadded to the mixture of ingredients mentioned above, as will be more particularly described hereinafter.

DESCRIPTION OF THE PREFERRED EMBODIMENT be added

By way of example, and not by way of limitation, there are given below two specific examples of the preparation of dry imitation vinegar products in accordance with the present invention.

EXAMPLE 1

40 grams of "Dykon", a sodium diacetate manufactured by Extrin Flavors, Inc., Federated Mills Division, Long Island City, N. Y., containing about 2 percent moisture, is dry blended with 10 grams of anhydrous sodium acetate, 50 grams of "Pomalus", dl malic acid manufactured by Allied Chemical Corp., 0.1 gram of dry powdered caramel (burnt sugar shade 85 %), 0.1 gram of spray dried apple flavor (a free flowing, entrapped powder), and 0.1 gram of anhydrous tricalcium phosphate conforming to "Food Chemicals Codex", published by the National Academy of Sciences, National Research Council. The weighing, handling, and blending of the ingredients are carried out in an atmosphere of about 32 percent relative humidity. The resulting mixture of dry imitation vinegar is free flowing and has a moisture content of 0.35 percent as determined in accordance with the Official Methods of the Association of Official Analytical Chemists, Eleventh Edition, Chapter: Cereal Foods, Section: Wheat Flour, Method: Distillation with benzene. Fourteen grams of the dry imitation vinegar mixture are mixed with 156 ml of water and the reconstituted liquid vinegar resulting therefrom is tested for pH and titratable acidity in accordance with the Official Methods of the AOAC described above. The pH of the liquid vinegar is found to be 3.6 and the titratable acidity is found to be 5.7 percent.

The dry imitation vinegar above is placed in an envelope made of a triple layered laminate in which the outer lamina is 0.005 inch thick polyethylene terephthalate polyester film, the inner lamina is 0.001 inch thick polyethylene film, and sandwiched between the outer and inner laminae is a sheet of aluminum foil 0.0035 inch thick. Along with the dry imitation vinegar mixture a porous, moisture vapor permeable Kraft paper envelope containing calcium oxide in the quantity of 0.25 oz. for 3 oz. of the dry imitation vinegar, sealed along the edges thereof to prevent contamination of the dry imitation vinegar, is placed within the laminated envelope and the laminated envelope is hermetically sealed. The laminated envelope is substantially mositure impermeable. Since the Kraft paper envelope is moisture vapor permeable, as soon as the laminated envelope is sealed, withdrawal of moisture from the dry imitation vinegar and absorption thereof by the calcium oxide in the Kraft paper envelope begins and continues as long as the laminated envelope of dry imitation vinegar is in storage.

The laminated envelope of dry imitation vinegar is stored at 100°F. for six months. At the end of this storage period the laminated envelope is opened and the dry imitation viengar is found to be free flowing as a powder and not to be caked in any portion thereof nor to have deteriorated to a slurry. It is found to have a moisture content of 0.05 percent. When reconstituted to form a liquid vinegar in the same manner as that described above for the reconstitution of the dry imitation vinegar as initially prepared, the pH of the liquid vinegar is found to be 3.6 and the titratable acidity is found to be 5.7 percent.

A portion of the dry imitation vinegar as initially prepared is sealed in a laminated envelope without having a Kraft paper envelope of calcium oxide included in the laminated envelope. This package of dry imitation vinegar is stored at 100°F. for six months. When opened, it is found to have deteriorated to produce a brown slurry which is unsuitable for making a reconstituted liquid vinegar. There is also evidence of delamination of the laminated envelope beginning.

EXAMPLE 2

37 grams of Dykon brand sodium diacetate, as in Example 1, is dry blended with 13 grams of anhydrous sodium acetate, 50 grams of Pomalus brand dl malic acid, 0.1 gram of dry powdered caramel (burnt sugar shade 85 %), 0.1 gram of spray dried apple flavor, and 0.5 gram of anhydrous tricalcium phosphate of the same type as used in Example 1. The weighing, handling, and blending are carried out as in Example 1. The resulting mixture of dry, imitation vinegar is a free flowing dry powder and has a moisture content of 0.32 percent, determined as in Example 1. Fourteen grams of the dry imitation vinegar mixture are mixed with 156 ml of water and the reconstituted liquid vinegar resulting therefrom is found to have a pH of 3.7 and a titratable acidity of 5.5 percent, as determined by the methods employed in Example 1.

The dry imitation vinegar above is placed in a laminated envelope of the same type as that used in Example 1 for storage of the mixture. A Kraft paper envelope containing 0.25 oz. of calcium oxide is placed in the laminated envelope along with 3 oz. of the dry imitation vinegar and the laminated envelope is hermetically sealed as in Example 1 and stored at 140°F. for six months. At the end of the storage period the laminated envelope is opened and the dry imitation vinegar is found to be a free flowing powder and not to be caked in any portion thereof nor to have deteriorated to a slurry. The moisture content is found to be 0.04 percent. When reconstituted to form a liquid vinegar in the same manner as in Example 1, the pH of the liquid vinegar is found to be 3.7 and the titratable acidity is found to be 5.5 percent.

A portion of the dry imitation vinegar as initially prepared is sealed in a laminated envelope without having a Kraft paper envelope of calcium oxide included in the laminated envelope. This package of dry imitation vinegar is stored at 140°F. Within a week the dry imitation vinegar becomes caked as observed by feeling the envelope and attempting to bend it. Within two weeks of the beginning of storage the dry imitation vinegar deteriorates to form a slurry. After six months of storage the laminated envelope is badly delaminated. it is thus seen that storage of dry imitation vinegars prepared in accordance with the present invention at temperatures as high as 140°F. is out of the question without in-package desiccation or other methods of producing and maintaining the dry imitation vinegars at very low moisture contents. 0.1 percent moisture is about the borderline value for safe storage at 140°F. if the dry imitation vinegar prepared in accordance with this invention is to remain a free flowing powder and not cause delamination of laminated envelopes in which it is now customary to package dry imitation vinegars.

All percentages of ingredients or of water expressed in the specification and claims are to be understood as being by weight unless otherwise stated.

As heretofore pointed out, the specific formulations may be varied somewhat to suit various tastes and preferences. For instance, sodium diacetate, calculated on a moisture-free basis, may be incorporated in the mixture to the extent of from about 36.0 percent to about 41.0 percent. Similarly, sodium acetate, calculated on a moisture-free basis, may be incorporated to the extent of from about 9.0 percent to about 14.0 percent. And dl malic acid may be incorporated to the extent of from about 45.0 percent to about 50.0 percent.

It is preferred that dl malic acid constitute about 50.0 percent of the dry imitation vinegar mixture. However, the malic acid percentage may be decreased to as low as 45.0 percent by adjusting the proportions of sodium diacetate and sodium acetate upwardly to produce a mixture which, upon reconstitution with water, produces an acceptable liquid vinegar. Liquid vinegars are generally acceptable if they have a pH within the limits of 3.4 ± 0.4 and a titratable acidity within the limits of 5.5 to 6.5 percent, calculated as acetic acid. Determinations of pH should be made in accordance with the Official Methods of the Association of Official Agricultural Chemists, Chapter: Cereal Foods, Section: Wheat Flour, Electrometric Method. Determinations of titratable acidity should be made in accordance with the same Official Methods, Chapter: Spices and Other Condiments, Section: Vinegars, Total Acids Method. The above-mentioned proportions of sodium diacetate, sodium acetate, and dl malic acid have been found to meet the above-stated pH and titratable acidity requirements and to exhibit excellent storage properties when the moisture content of the dry imitation vinegar composition is kept below 0.1 percent.

To make the mixture flow more readily, a small proportion of a flow-improving material, such as tricalcium phosphate, for example from about 0.01 to about 1.0 percent, but preferably about 0.1 percent, may be added and thoroughly mixed with the other ingredients.

To impart an apple vinegar flavor to the reconstituted liquid vinegar, a small proportion of spray-dried apple flavor, for example from about 0.01 to about 1.0 percent, but preferably about 0.1 percent, may be added and thoroughly mixed with the other ingredients of the mixture.

To impart a desirable color to the reconstituted liquid vinegar, a small proportion of dry caramel coloring, for example from about 0.01 to about 1.0 percent, but preferably about 0.1 percent, may be added and thoroughly mixed with the other ingredients of the mixture.

The above-stated percentages of tricalcium phosphate, apple flavor, and caramel coloring are based on 100 parts of a mixture of the three basic ingredients, i.e. sodium diacetate, sodium acetate, and dl malic acid. They constitute minor proportions of the dry imitation vinegar product. An acceptable dry imitation vinegar can be prepared without adding them, but the flow properties of the dry powder and the organoleptic and aesthetic characteristics of flavor and color of the reconstituted liquid vinegar are improved if they are present in the final composition.

The acidic character of the dry imitation vinegar of the invention is derived from both the sodium diacetate and the dl malic acid. The sodium acetate exercises a buffering action on the sodium diacetate and the dl malic acid, minimizing the release of free acetic acid. The more free acetic acid the composition releases, the greater the tendency thereof to cake at first and ultimately to produce a brown slurry which has a strong delaminating capacity with respect to laminated packaging materials in which the dry imitation vinegar mixture may be packaged.

The accepted method of preparing a reconstituted liquid vinegar from a dry imitation vinegar prepared in accordance with the invention is to mix 3.0 grams of the dry imitation vinegar with sufficient water to make a quart of liquid vinegar. Dry imitation vinegars prepared using sodium diacetate, sodium acetate, and dl malic acid in accordance with the above-stated percentages will, when reconstituted as described above, produce liquid vinegars having pH and titratable acidity values within the above-stated ranges.

Wherever moisture content of the dry imitation vinegar mixture or one of its components is referred to in the specification or the claims, it is to be understood that the moisture content is determined in accordance with the Official Methods of the Association of Official Agricultural Chemists, Chapter: Cereal Foods, Section: Wheat Flour, Method: Distillation with benzene.

The moisture content of the mixture, when first prepared, should be below about 0.4 percent by weight and it should be maintained below about 0.4 percent until the mixture has been hermetically sealed within a moisture impermeable container. If the dry imitation vinegar is to be stored at room temperature or lower temperatures, in-package desiccation to further reduce the moisture content will not be necessary. However, if the dry imitation vinegar is to be stored for a substantial time, such as six months or longer, at high temperatures, for example 100°F. or higher, in order to avoid deterioration to a slurry with liberation of acetic acid vapors accompanied by delamination of laminated packaging materials, the average moisture content of the dry imitation vinegar should be reduced to less than about 0.1 percent within three to four days after packaging and it should be maintained below about 0.1 percent for the duration of storage of the dry imitation vinegar. This may be accomplished by a variety of methods, the simplest being in-package desiccation using calcium oxide as the desiccant. The maximum ratio of the mixture to calcium oxide which has been found to be effective for reducing the moisture content of the mixture to below 0.1 percent is about 12 parts of the mixture to 1 part of calcium oxide by weight. Lower ratios than this would be acceptable but would increase the cost of the product unnecessarily.

If the various ingredients are mixed in an atmosphere having a relative humidity below 35 percent, the average mositure content of the mixture at the time of packaging will be less than about 4.0 percent and it will be reducible to less than 0.1 prcent by in-package desiccation with calcium oxide while preventing caking or slurry formation. This will usually occur within three to four days. However, if the relative humidity of the atmosphere in which mixing occurs is above 35 percent, there is great danger that the sodium diacetate, which is very hygroscopic, will absorb enough moisture from the atmosphere to cause the mixture to become so difficult to dehydrate by in-package desiccation to less than 0.1 percent moisture content that storage of the packaged mixture at high temperatures will result in some caking or slurry formation. Hence, it is preferred to keep the atmosphere in which the ingredients of the dry imitation vinegar are mixed and packaged below about 35 percent relative humidity and to maintain the moisture content of the mixture below about 0.4 percent throughout the mixing and packaging of the dry imitation vinegar, particularly if there is any likelihood that the packaged mixture will be exposed to temperatures of 100°F. or higher within about three to four days after packaging of the mixture.

The dry imitation vinegar compositions of the present invention are very useful, especially in military rations. A very small weight and bulk volume of dry material is capable of producing a large amount of vinegar at any location where water is available. The product, when properly packaged, withstands virtually any adverse storage conditions found on the earth for long periods of time, provided the packages are not punctured, thereby letting atmospheric moisture come in contact with the product prematurely.

It will be understood that various changes in the details, materials and arrangements of parts which have been herein described and illustrated in order to explain the nature of the invention, may be made by those skilled in the art within the principle and scope of the invention.

We claim:

1. A package containing a dry imitation vinegar having long term storage stability at high temperatures, said dry imitation vinegar comprising a mixture of sodium diacetate, sodium acetate, and dl malic acid in amounts sufficient to produce a liquid vinegar upon reconstitution, said mixture being inclosed in a hermetically sealed moisture impermeable container having laminated walls comprising an outer lamina of polyethylene terephthalate film, an inner lamina of polyethylene film, and an interlayer of aluminum foil sandwiched between said outer lamina and said inner lamina, said package also containing a mosiure vapor permeable envelope containing calcium oxide in an amount sufficient to reduce the moisture content of said mixture to less than 0.1 %, said calcium oxide being in moisture vapor exchange relation to said mixture, 2. A package according to claim 1, wherein said mixture comprises from about 36.0 percent to about 41.0 percent sodium diacetate, from about 9.0 percent to about 14.0 percent sodium acetate, and from about 45.0 percent to about 50.0 percent dl malic acid.

* * * * *